Patented Sept. 8, 1942

2,294,889

UNITED STATES PATENT OFFICE 2,294,889

MEDICINAL PRODUCT

Alfred Barol, Philadelphia, Pa., assignor to John Wyeth & Brother, Incorporated, Philadelphia, Pa., a corporation of Delaware No Drawing. Application June 24, 1940, Serial No. 342,180

4 Claims. (Cl. 167—72)

This invention relates to medicinal products for the treatment of the gastro-intestinal tract, such product consisting, essentially, of a preparation of aluminum phosphate.

In the reduction of the degree of acidity of the gastric juice, when such acidity reduction is necessary to permit healing of lesions in the stomach and duodenum, it is common practice to administer such substances as sodium bicarbonate, calcium carbonate, magnesium carbonate, magnesium oxide, and other substances capable of reaction with the hydrochloric acid in the gastric juice to form therewith neutral or slightly alkaline mixtures.

Such neutral or slightly alkaline mixtures, usually of pH range of from 6 to 8, while producing the desired effect of nonacidity, have been shown by many investigators to have undesirable secondary effects of either eliciting additional production of acid in the stomach or side effect from the salts formed on the circulation after such salts have been absorbed by the system of the patient.

More recently, insoluble compounds of aluminum have been used for this purpose in the belief that even though the administration of such compounds does not give complete neutralization of gastric acidity to pH 7, there is sufficient reduction of acidity in the gastric juice to a pH of from 3.5 to 4.0, or a buffering thereof, to a point where the acidity is sufficiently reduced, as compared to the original untreated gastric juice, to permit healing of lesions and inflammations of the stomach and duodenum. Due to the unabsorbable nature of the salts or compounds formed in the reaction, there is no effect on the circulation from the formed salts and no effect on the tissues beyond those immediately exposed to the substance, such as the mucosa and tissues forming the so-called lumen of the gastro-intestinal tract.

These prior compounds of aluminum have been various forms of hydrate or hydroxide either in dry or gel form and secured by various methods of precipitation. While they have served their desired purpose in most cases there appears to be an occasional need for a further preparation, which while more slowly effective, can be tolerated by more persons and in particular those who suffer from pancreatic insufficiencies and are unable to tolerate the preparations of hydrates or hydroxides of aluminum.

I have prepared a further compound of aluminum, namely, aluminum phosphate, in a sufficiently finely divided state so that while it is quite insoluble, it yet serves the purpose of reducing gastric acidity without obnoxious side effects on any type of patient even though he be suffering from a defect such as pancreatic deficiency. My aluminum phosphate compound has been tested on those suffering from artificially produced deficiency of pancreatic function and has been found, not only to give the desired acidity reduction, but to cause healing of lesions and inflammations in the gastro-intestinal tract while the previously used medical products, including preparations of aluminum other than the phosphate, do not have this healing effect.

As an illustrative example of preparing my product the following is given.

Thirty-six (36) pounds of aluminum chloride are dissolved in any suitable vessel in twenty (20) gallons of water. Twenty-one (21) pounds of dried dibasic sodium phosphate are dissolved in twenty-two and one-half (22½) gallons of water and this second solution added slowly to the solution of aluminum chloride in water previously formed. When the reaction of forming the aluminum phosphate is complete the combined solution is neutralized with diluted ammonia water to a pH of between 6.8 to 7.4. The mixture is strained and washed until it is practically free from soluble salts when sufficient water is removed so that the mixture shows a strength of 4% of aluminum phosphate. In order to make the product more palatable sweetening agents such as glycerin, sugar, or saccharin may be added and a flavor such as oil of peppermint additionally incorporated, if desired.

The product of the above example in the fluid form having a strength of 4% of aluminum phosphate is the preferred product which has given the best results. A partially or totally dried product, or one containing a higher concentration of aluminum phosphate may be prepared by control of the dehydration step, in order to give convenience of administration or greater strength of aluminum phosphate, as desired.

What I claim is:

1. An antacid composition for treatment of the gastro-intestinal tract containing aluminum phosphate.

2. An antacid composition for treatment of the gastro-intestinal tract comprising aluminum phosphate in a liquid vehicle.

3. An antacid composition for treatment of the gastro-intestinal tract comprising aluminum phosphate in a liquid vehicle, such aluminum phosphate being of a strength of approximately 4% of the completed product.

4. An antacid composition for treatment of the gastro-intestinal tract comprising aluminum phosphate and a liquid vehicle therefor wherein such vehicle comprises the major portion of the completed product.

ALFRED BAROL.